United States Patent
Binek et al.

(10) Patent No.: US 12,280,537 B2
(45) Date of Patent: Apr. 22, 2025

(54) BUILD PLATE LEVELING

(71) Applicant: Hamilton Sundstrand Corporation, Charlotte, NC (US)

(72) Inventors: Lawrence Binek, Glastonbury, CT (US); Zachary Ryan Gibbons, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1266 days.

(21) Appl. No.: 16/428,212

(22) Filed: May 31, 2019

(65) Prior Publication Data

US 2020/0376757 A1 Dec. 3, 2020

(51) Int. Cl.
| | |
|---|---|
| *B33Y 10/00* | (2015.01) |
| *B22F 10/28* | (2021.01) |
| *B22F 10/31* | (2021.01) |
| *B22F 12/37* | (2021.01) |
| *B22F 12/67* | (2021.01) |
| *B22F 12/90* | (2021.01) |
| *B29C 64/153* | (2017.01) |
| *B29C 64/205* | (2017.01) |
| *B29C 64/393* | (2017.01) |
| *B33Y 30/00* | (2015.01) |
| *B33Y 50/02* | (2015.01) |

(52) U.S. Cl.
CPC ............ *B29C 64/153* (2017.08); *B22F 10/28* (2021.01); *B22F 10/31* (2021.01); *B22F 12/37* (2021.01); *B22F 12/67* (2021.01); *B22F 12/90* (2021.01); *B29C 64/205* (2017.08); *B29C 64/393* (2017.08); *B33Y 10/00* (2014.12); *B33Y 30/00* (2014.12); *B33Y 50/02* (2014.12)

(58) Field of Classification Search
CPC ...................................................... B29C 64/00
USPC ............................................................ 264/40
See application file for complete search history.

(56) References Cited

U.S. PATENT DOCUMENTS

| | | | |
|---|---|---|---|
| 7,847,212 B2 | 12/2010 | Renz et al. | |
| 8,105,527 B2 | 1/2012 | Wahlstrom | |
| 10,076,879 B2* | 9/2018 | Bamberg | ............. B23K 31/125 |
| 2007/0077323 A1 | 4/2007 | Stonesmith et al. | |
| 2017/0050380 A1* | 2/2017 | Chang | .................. B29C 64/393 |
| 2018/0133800 A1 | 5/2018 | Pieger et al. | |
| 2018/0215102 A1* | 8/2018 | Amaya | ................... B22F 10/20 |

(Continued)

FOREIGN PATENT DOCUMENTS

| | | |
|---|---|---|
| DE | 102014213888 A1 | 1/2016 |
| EP | 1769903 A2 | 4/2007 |

OTHER PUBLICATIONS

Extended European search report issued in corresponding EP application No. 19211005.4, dated May 12, 2020.

*Primary Examiner* — Yung-Sheng M Tsui
(74) *Attorney, Agent, or Firm* — Bachman & LaPointe, P.C.

(57) ABSTRACT

A powder recoater for an additive manufacturing machine can include a body, a recoater blade extending downwardly from the body, and at least two distance probes attached to the body and configured to determine a distance to a build plate to determine if a recoater blade is parallel to the build plate and/or if a build plate is level. The at least two distance probes can be touch probes configured to determine if a build plate is contacting one or more of the probes. Any other suitable probe type is contemplated herein.

9 Claims, 3 Drawing Sheets

(56) References Cited

U.S. PATENT DOCUMENTS

| | | | | |
|---|---|---|---|---|
| 2018/0326712 A1* | 11/2018 | Raghavan | .............. | B33Y 50/02 |
| 2018/0348367 A1* | 12/2018 | Crear | .................... | B29C 64/307 |
| 2020/0139625 A1* | 5/2020 | Allanic | .................. | B29C 64/20 |
| 2020/0238613 A1* | 7/2020 | Shi | .......................... | B22F 10/20 |
| 2020/0376773 A1* | 12/2020 | Sweetland | .............. | B22F 10/37 |

\* cited by examiner

BUILD PLATE LEVELING

BACKGROUND

1. Field

This disclosure relates to additive manufacturing systems, more specifically to leveling of build plates.

2. Description of Related Art

Bed leveling is a critical step in the additive manufacturing process. It is a time consuming operation which is subject to interpretation and if executed incorrectly, will negatively affect the quality of the build. Bed leveling practices are largely operator dependent and have the potential for a high degree of variability.

Such conventional methods and systems have generally been considered satisfactory for their intended purpose. However, there is still a need in the art for improved build plate leveling systems and methods. The present disclosure provides a solution for this need.

SUMMARY

A powder recoater for an additive manufacturing machine can include a body, a recoater blade extending downwardly from the body, and at least two distance probes attached to the body and configured to determine a distance to a build plate to determine if a recoater blade is parallel to the build plate and/or if a build plate is level. The at least two distance probes can be touch probes configured to determine if a build plate is contacting one or more of the probes. Any other suitable probe type is contemplated herein.

The at least two distance probes can include a first distance probe adjacent a first lateral end of the recoater and a second distance probe adjacent a second lateral end of the recoater. The at least two distance probes can be disposed on a lip extending from the body, for example.

An additive manufacturing build plate leveling system can include a powder recoater as disclosed herein (e.g., as described above). The system can further include a controller configured to control a position and orientation of a build plate as a function of signals from the at least two distance sensors. In certain embodiments, the controller can be configured to control a position of the recoater also.

The system can also include a plurality of motors operatively connected to the build plate to orient the build plate. The plurality of motors can be operatively connected to the controller to control the position and orientation of the build plate. The controller can be configured to operate the build plate and the plurality of motors to perform any suitable embodiment of a method for leveling disclosed herein.

In accordance with at least one aspect of this disclosure, a method for leveling a build plate of an additive manufacturing machine can include lowering the build plate to prevent recoater crashing, positioning the recoater in a first position over the build plate, raising the build plate until contacting one or more of the distance probes or until the build plate is within a predetermined distance of one or more of the distance probes, and if not all of the distance probes are contacted or within a predetermined distance simultaneously, then lowering the build plate and tilting the build plate toward level by one unit of iteration, and repeating from raising the build plate. The method can further include positioning the recoater in a second position over the build plate if all of the distance probes are contacted or within a predetermined distance simultaneously, and tilting the build plate in a perpendicular axis until the distance probes are contacted or within a predetermined distance of the build plate in the second position to complete leveling of the build plate. The method can include lowering the build plate to an initial build position.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
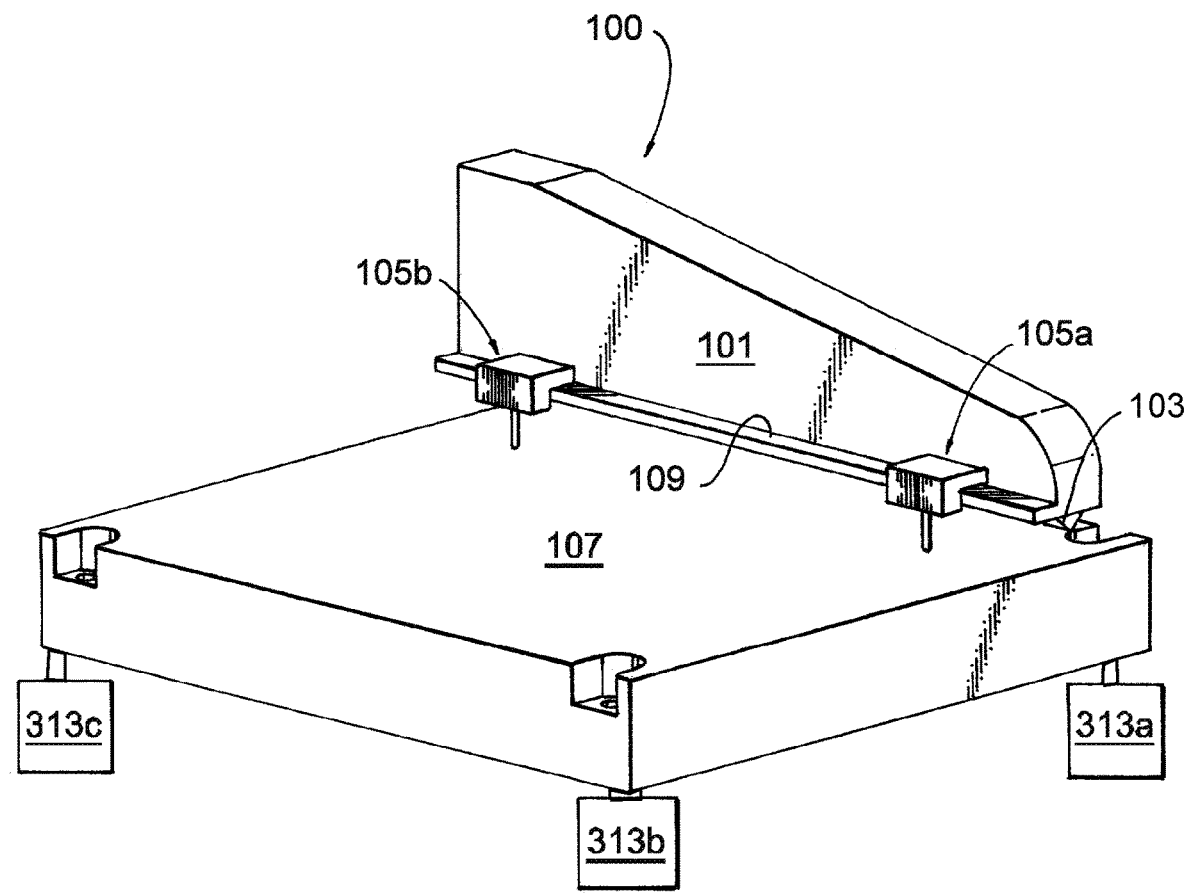
FIG. 1 is a perspective view of an embodiment of a system in accordance with this disclosure.
Figure 2:
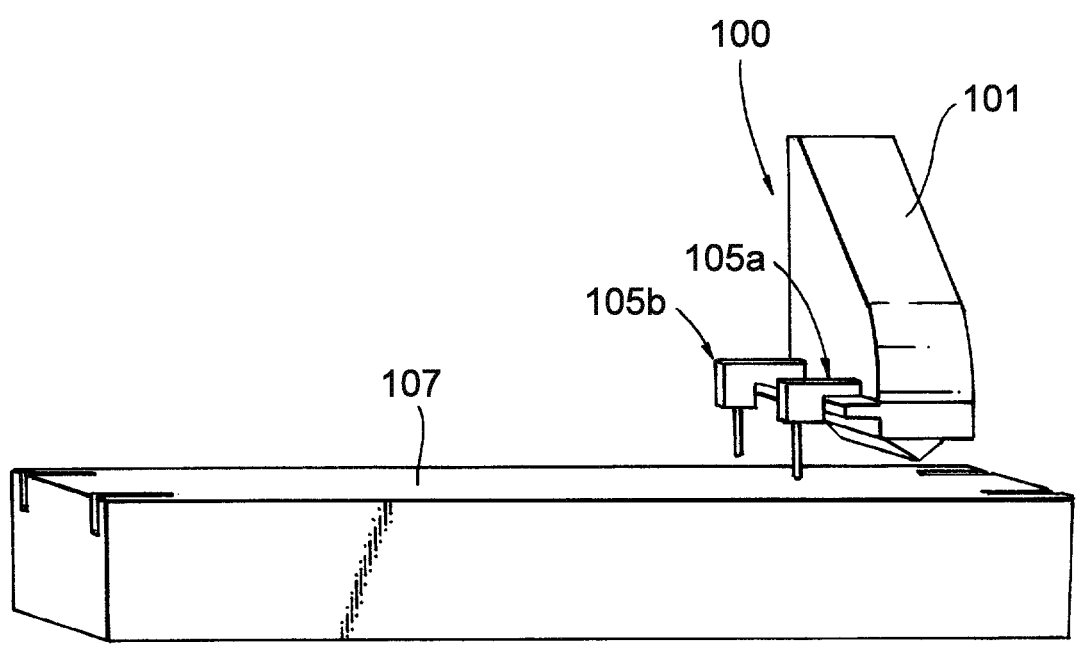
FIG. 2 is a perspective view of the embodiment of FIG. 1.
Figure 3:
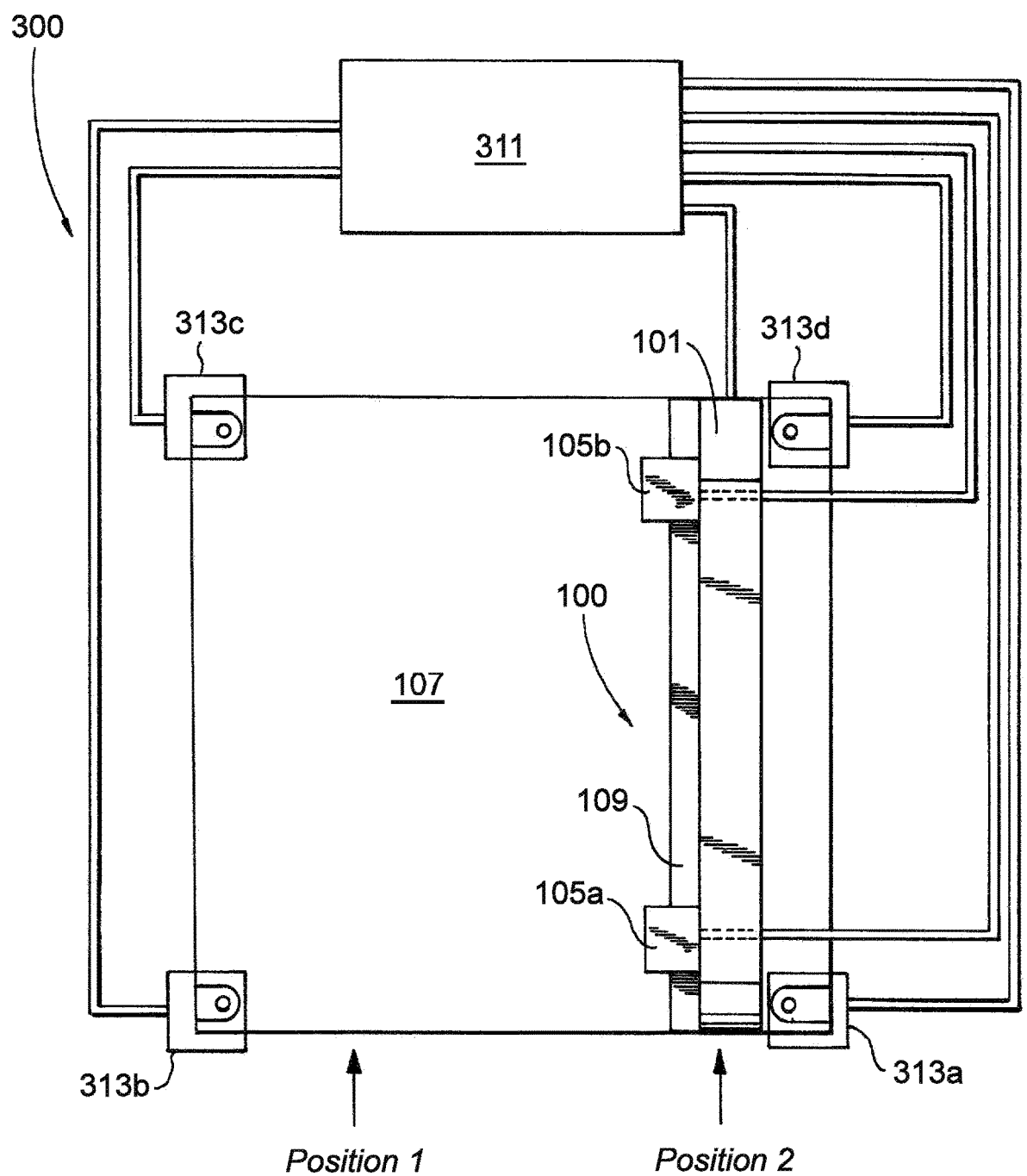
FIG. 3 is a plan view of the embodiment of FIG. 1, showing an embodiment of a controller connected thereto.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. Certain embodiments described herein can be used for improved leveling.

Referring to FIG. 1, a powder recoater 100 for an additive manufacturing machine (e.g., a laser powder bed fusion machine) can include a body 101 and a recoater blade 103 extending downwardly from the body 101. The recoater 100 can include at least two distance probes 105a, b attached to the body 101 and configured to determine a distance to a build plate 107 to determine if the recoater 100 is parallel to the build plate 107 and/or if a build plate 107 is level (e.g., relative to the recoater).

The at least two distance probes 105a, b can be touch probes (e.g., limit switches), e.g., as shown, configured to determine if a build plate 105 is contacting one or more of the probes 105a, 105b. Any other suitable probe type (e.g., a proximity sensor configured to determine a gap distance between the sensor and the build plate) is contemplated herein.

The at least two distance probes 105a, 105b can include a first distance probe 105a adjacent a first lateral end (e.g., an end of the long dimension of the recoater body 101) of the recoater 100 and a second distance probe 105b adjacent a second lateral end of the recoater 100. The at least two distance probes 105a, b can be disposed on a lip 109 extending from the body 101, for example.

Referring additionally to FIG. 3, an additive manufacturing build plate leveling system 300 can include a powder recoater 100 as disclosed herein (e.g., as described above). The system 100 can further include a controller 311 configured to control a position and orientation of a build plate 107 as a function of signals from the at least two distance sensors 105a, b. For example, the system 300 can include any suitable build plate movement system (e.g., a lifting piston to lift the entire build plate up and down during additive manufacturing as appreciated by those having ordinary skill in the art). In certain embodiments, the controller 311 can be configured to control a position of the recoater 100 also (e.g., between at least two positions as shown in FIG. 3).

The system 300 can also include a plurality of motors 313a, b, c, d operatively connected to the build plate 107 to orient the build plate 107 for leveling. The plurality of motors 313a, b, c, d can be operatively connected to the controller 311 to control the position and/or orientation of the build plate 107 (e.g., to raise or lower each corner of the build plate). The controller 311 can be configured to operate the build plate 107 and the plurality of motors 313a, b, c, d to perform any suitable embodiment of a method for leveling disclosed herein, e.g., as described below. The controller 311 can include any suitable hardware module(s) and/or software module(s) configured to perform any suitable function or method disclosed herein, and/or any other suitable function(s) and/or method(s).

In accordance with at least one aspect of this disclosure, a method for leveling a build plate of an additive manufacturing machine can include lowering the build plate 107 (e.g., lowering the entire build plate 107 with a piston or with all motors 313a, b, c, d) to prevent recoater crashing and positioning the recoater 100 in a first position over the build plate 107. The method can include raising the build plate 107 until contacting one or more of the distance probes 105a, b, or until the build plate 107 is within a predetermined distance (e.g., 10 mm) of one or more of the distance probes 105a, 105b. If not all of the distance probes 105a, 105b are contacted or within a predetermined distance simultaneously, then the method can include lowering the build plate 107 and tilting the build plate 107 toward level (e.g., raising both corners on the side that is not contacted or within the predetermined distance) by one unit of iteration (e.g., 1 mm), and repeating from raising the build plate 107 until all distance probes 105a, 105b contact or are at the predetermined distance at the same time. For example, if probe 105a is contacted first, and/or probe 105b is not contacted when raising the build plate 107, the controller 311 can control motors 313c and 313d to raise both corners up to tilt the build plate 107 toward level. Eventually, the build plate 107 will be leveled in a first axis of tilt (e.g., rotation about the direction of recoater stroke) with a sufficient amount of iterations.

If all of the distance probes 105a, 105b are contacted or within a predetermined distance simultaneously, the method can further include positioning the recoater 100 in a second position (e.g., as shown in FIG. 3) over the build plate 107. After moving to the second position, the method can include tilting the build plate 107 in a perpendicular axis to the first axis of tilt until at least one of the distance probes 105a, b are contacted or within a predetermined distance of the build plate 107 in the second position to complete leveling of the build plate 107. For example, when the recoater 100 is in the second position, the controller 311 can control the motors 313b and 313c to raise together until one or more of the probes 105a, 105b are contacted or are a predetermined distance from the build plate 107.

The method can include lowering the build plate 107 to an initial build position after leveling (e.g., one layer thickness less than the probe contact height of the build plate 107) to prepare for use of the build plate 107. Any other suitable methods and/or portions thereof are contemplated herein.

While four motors 313a, b, c, d are shown, and suitable number of motors (e.g., 3 or more) in any suitable position on the build plate 107 are contemplated herein. The motors can be of any suitable type (e.g., a stepper motor) and have any suitable extension hardware to raise and lower a portion of the build plate 107. While a square shaped build plate is shown, the build plate can include any suitable shape (e.g., triangular).

Embodiment include at least two probes that are in alignment with the build plate 107, for example. In certain embodiments, a third probe can be placed the middle to indicate if the build plate has any curvature, however, in certain cases, it can be assumed that the build plate 107 is not curved or distorted.

Embodiments of a leveling method can include lowering the build plate to avoid a crash and moving the recoater/probes to Position 1. The build plate z-height can be increased until a probe is contacted. Depending on which probe is contacted, the plate can lower, and can automatically tilt one increment closer to level. The process can then be repeated until both touch probes are contacted simultaneously, for example. The process can be repeated and/or similar for leveling between Position 1 and Position 2. In certain embodiments of a method, only one probes may be needed required for leveling at Position 2. In embodiments, once level, the recoater can move to the homing position, off of the build plate, for example. The build plate z-height position can be referenced, and the plate height can be increased by the known vertical distance between the touch-probe trigger point and the recoater blade, minus one layer thickness. The touch probes can be retracted or removed to avoid interfering with the build process, for example. The build plate will then be level, and in the build start position.

As appreciated by those having ordinary skill in the art, leveling a build plate requires aligning the top plane of the build plate with the travel plane of the recoater movement. Machine depending, either the build plate position is adjusted to the recoater, or the recoater is adjusted to the build plate. Either methods works to create the parallel plane required for a successful first layer of the build. Accordingly, methods and systems as disclosed herein can include changing the recoater orientation instead of the build plate orientation based on the distance probes, e.g., instead of changing the build plate orientation.

Current methods for laser powder bed fusion most often involve the use of shim stock in a manual procedure for leveling the plate. Embodiments automate the process and make the process more accurate, e.g., using retractable touch-probe proximity sensors or any other suitable sensor probes. Instead of the manual controls to adjust either the plate position or the recoater position, controllable motors can be used instead. Two or more probes (e.g., touch probes) can then be mounted to either end of the recoater, and through an iterative feedback loop automatically level the plate. A feedback driven critical process is much more reliable than operator judgement. Since the process is repeatable, there is be less variability between build set up on a single additive manufacturing machine which results in a more consistent build quality from plate to plate. Automation also allows for data acquisition and harvesting which can be used for machine learning studies and closed loop machine systems, for example.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An additive manufacturing build plate leveling system, comprising:
    a powder recoater for an additive manufacturing machine, comprising:
        a body;
        a recoater blade extending downwardly from the body; and
        at least two distance probes attached to the body and configured to determine a distance to a build plate to determine if a build plate is level,
    a controller configured to control a position and orientation of a build plate as a function of signals from the at least two distance probes, wherein the controller is configured to control a position of the recoater;

a plurality of motors operatively connected to the build plate to orient the build plate, wherein the plurality of motors are operatively connected to the controller to control the position and orientation of the build plate, wherein the controller is configured to operate the build plate and the plurality of motors to perform the method of:

lowering the build plate to prevent recoater crashing;

positioning the recoater in a first position over the build plate;

raising the build plate until contacting one or more of the at least two distance probes or until the build plate is within a predetermined distance of one or more of the distance probes; and if not all of the distance probes are contacted or within a predetermined distance simultaneously, then lowering the build plate and tilting the build plate toward level by one unit of iteration, and repeating from raising the build plate.

2. The system of claim 1, wherein the at least two distance probes are touch probes configured to determine if a build plate is contacting one or more of the probes.

3. The system of claim 1, wherein the at least two distance probes include a first distance probe adjacent a first lateral end of the recoater and a second distance probe adjacent a second lateral end of the recoater.

4. The system of claim 3, wherein the at least two distance probes are disposed on a lip extending from the body.

5. The system of claim 1, wherein the controller is further configured to operate the build plate and the plurality of motors to perform the method which further includes:

positioning the recoater in a second position over the build plate if all of the distance probes are contacted or within a predetermined distance simultaneously; and tilting the build plate in a perpendicular axis until the distance probes are contacted or within a predetermined distance of the build plate in the second position to complete leveling of the build plate.

6. The system of claim 5, wherein the controller is further configured to operate the build plate and the plurality of motors to perform the method which further includes:

lowering the build plate to an initial build position.

7. A method for leveling a build plate of an additive manufacturing machine, comprising:

lowering the build plate to prevent recoater crashing;

positioning the recoater in a first position over the build plate;

raising the build plate until contacting one or more of at least two distance probes or until the build plate is within a predetermined distance of one or more of the at least two distance probes; and if not all of the distance probes are contacted or within a predetermined distance simultaneously, then lowering the build plate and tilting the build plate toward level by one unit of iteration, and repeating from raising the build plate.

8. The method of claim 7, further comprising:

positioning the recoater in a second position over the build plate if all of the distance probes are contacted or within a predetermined distance simultaneously; and tilting the build plate in a perpendicular axis until the distance probes are contacted or within a predetermined distance of the build plate in the second position to complete leveling of the build plate.

9. The system of claim 8, further comprising:

lowering the build plate to an initial build position.

* * * * *